United States Patent
Li et al.

(10) Patent No.: US 9,148,879 B2
(45) Date of Patent: *Sep. 29, 2015

(54) METHOD FOR TRIGGERING TERMINAL TO SEND SOUNDING REFERENCE SIGNAL, TERMINAL, AND BASE STATION

(71) Applicant: SNAPTRACK, INC., San Diego, CA (US)

(72) Inventors: Qiang Li, Beijing (CN); David Mazzarese, Beijing (CN)

(73) Assignee: SNAPTRACK, INC., San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/278,082

(22) Filed: May 15, 2014

(65) Prior Publication Data

US 2014/0247789 A1 Sep. 4, 2014

Related U.S. Application Data

(63) Continuation of application No. 13/633,311, filed on Oct. 2, 2012, now Pat. No. 8,767,629, which is a continuation of application No. PCT/CN2011/073303, filed on Apr. 26, 2011.

(30) Foreign Application Priority Data

Jul. 13, 2010 (CN) .......................... 2010 1 0228436
Oct. 11, 2010 (CN) .......................... 2010 1 0502725

(51) Int. Cl.
 H04W 72/04 (2009.01)
 H04L 5/00 (2006.01)

(52) U.S. Cl.
 CPC ........... *H04W 72/042* (2013.01); *H04L 5/0048* (2013.01); *H04L 5/0058* (2013.01); *H04L 5/0092* (2013.01)

(58) Field of Classification Search
 None
 See application file for complete search history.

(56) References Cited

U.S. PATENT DOCUMENTS 8,406,215 B2 * 3/2013 Papasakellariou et al. ... 370/349
8,422,387 B2 * 4/2013 Hsu ............................... 370/252

(Continued)

FOREIGN PATENT DOCUMENTS

CN 101330325 A 12/2008
CN 101483915 A 7/2009

(Continued)

OTHER PUBLICATIONS

"Channel sounding enhancements for LTE-Advanced", Nokia Siemens Networks, 3GPP TSG RAN WG1 Meeting #61bis, Jun. 28-Jul. 2, 2010, 2 pages.

(Continued)

*Primary Examiner* — Hong Cho
(74) *Attorney, Agent, or Firm* — Seyfarth Shaw LLP

(57) ABSTRACT

A method for triggering a terminal to send a sounding reference signal includes: obtaining requirement information of measurement, where the requirement information includes a position and a bandwidth of a frequency band to be measured; selecting a resource for a terminal from at least two preset resource patterns according to the requirement information, where multiple types of resource information are preset in each resource pattern of the at least two preset resource patterns to indicate a resource; and triggering the terminal to utilize the selected resource to send a sounding reference signal.

22 Claims, 6 Drawing Sheets

(56) References Cited

U.S. PATENT DOCUMENTS

| | | | |
|---|---|---|---|
| 8,619,693 B2* | 12/2013 | Noh et al. | 370/329 |
| 2009/0181690 A1* | 7/2009 | McCoy et al. | 455/452.1 |
| 2010/0054161 A1* | 3/2010 | Montojo et al. | 370/280 |
| 2010/0067410 A1 | 3/2010 | He et al. | |
| 2010/0067472 A1 | 3/2010 | Ball et al. | |
| 2010/0124237 A1* | 5/2010 | Chun et al. | 370/469 |
| 2010/0195624 A1* | 8/2010 | Zhang et al. | 370/335 |
| 2010/0246561 A1* | 9/2010 | Shin et al. | 370/345 |
| 2010/0296451 A1 | 11/2010 | Li et al. | |
| 2011/0090862 A1 | 4/2011 | Liang et al. | |
| 2011/0310821 A1* | 12/2011 | Kim et al. | 370/329 |
| 2012/0014349 A1* | 1/2012 | Chung et al. | 370/329 |
| 2012/0039239 A1* | 2/2012 | Park et al. | 370/315 |
| 2012/0287900 A1* | 11/2012 | Seo et al. | 370/329 |
| 2013/0028211 A1 | 1/2013 | Li et al. | |
| 2013/0058306 A1* | 3/2013 | Noh et al. | 370/329 |
| 2014/0092862 A1* | 4/2014 | Noh et al. | 370/330 |

FOREIGN PATENT DOCUMENTS

| | | |
|---|---|---|
| CN | 101540631 A | 9/2009 |
| CN | 101547022 A | 9/2009 |
| CN | 101677458 A | 3/2010 |
| CN | 101772031 A | 7/2010 |
| CN | 102014506 A | 4/2011 |
| EP | 2 426 831 A1 | 3/2012 |

OTHER PUBLICATIONS

"On dynamic aperiodic SRS in LTE-A", ZTE, 3GPP TSG-RAN WG1 #61bis, Jun. 28-Jul. 2, 2010, 4 pages.

"Further details on aperiodic dynamic SRS", 3GPP TSG-RAN WG1 #61bis, Jun. 28-Jul. 2, 2010, 3 pages.

"Considerations for dynamic aperiodic SRS", Huawei, 3GPP TSG RAN WG1 meeting #62, Aug. 23-27, 2010, 4 pages.

"Remaining issues for aperiodic sounding", Huawei, HiSilicon, 3GPP TSG RAN WG1 meeting #62bis, Oct. 11-15, 2010, 6 pages.

"Further details on aperiodic dynamic SRS", 3GPP TSG-RAN WG1 #61bis, May 10-14, 2010, 3 pages.

"Aperiodic SRS for LTE-A", Motorola, 3GPP TSG RAN1 #60bis, Apr. 12-16, 2010, 1 page.

"3rd Generation Partnership Project; Technical Specification Group Radio Access Network; Evolved Universal Terrestrial Radio Access (E-UTRA); Physical layer procedures (Release 9)", 3GPP TS 36.213 V9.2.0, Jun. 2010, 80 pages.

* cited by examiner

METHOD FOR TRIGGERING TERMINAL TO SEND SOUNDING REFERENCE SIGNAL, TERMINAL, AND BASE STATION

CROSS-REFERENCE TO RELATED APPLICATIONS

This application is a continuation of U.S. application Ser. No. 13/633,311, filed on Oct. 2, 2012, now U.S. Pat. No. 8,767,629, which is a continuation of International Application No. PCT/CN2011/073303, filed on Apr. 26, 2011, which claims priority to Chinese Patent Application No. 201010502725.2, filed on Oct. 11, 2010 and Chinese Patent Application No. 201010228436.8, filed on Jul. 13, 2010, all of which are hereby incorporated by reference in their entireties.

TECHNICAL FIELD

The present invention relates to the field of communication technologies, and in particular, to a method for triggering a terminal to send a sounding reference signal, a terminal, and abase station.

BACKGROUND

In a long term evolution advanced (LTE-A, Long Term Evolution Advanced) communication system, a terminal needs to transmit a sounding reference signal (SRS, Sounding Reference Signal) to an evolved NodeB (eNB, E-UTRAN NodeB) to help the eNodeB obtain uplink channel information, so as to implement functions, such as frequency selective scheduling and link adaptation.

In a multi-antenna transmitting mode, the eNodeB needs to measure each antenna port of the terminal. Therefore, each antenna port sends an SRS periodically, which inevitably leads to insufficiency of SRS resources. In fact, in many cases, the terminal does not need to keep sending the SRS all the time. Therefore, in the prior art, it is proposed that sending the SRS dynamically and non-periodically is used to reduce resource requirements. That is, the eNodeB determines whether a terminal needs to send the SRS according to actual conditions. If the terminal needs to send the SRS, the eNodeB sends trigger information through a physical downlink control channel (PDCCH, Physical Downlink Control Channel) to instruct the terminal to send the SRS. After triggered, the terminal sends the SRS according to resource information. The resource information includes SRS sending time, a frequency band position occupied by the SRS, a bandwidth, a cyclic shift (CS, Cyclic Shift), a comb, and so on.

Currently, there are mainly two methods for obtaining resource information. A first one is that the eNodeB carries the resource information in a trigger command when delivering the trigger command to the terminal; and a second one is that the eNodeB presets an SRS resource pattern (hereinafter referred to as resource pattern) for each terminal through higher-layer signaling, and when the terminal is triggered, the terminal finds proper resource information in the resource pattern according to trigger time, and then uses the resource information to send the SRS. Because the resource information involves many parameters, if the first method is adopted, PDCCH load is high. Therefore, in the prior art, the second method is mainly adopted to obtain the resource information.

Adopting the second method may reduce the PDCCH load, but it is not flexible. For example, if a bandwidth in the preset resource pattern is narrow, when a wide frequency band is measured, the SRS needs to be sent for many times to cover the frequency band that needs to be measured, which leads to high PDCCH overhead and long measurement delay; if a bandwidth in the preset resource pattern is very wide, when a narrow frequency band is measured, a frequency band that needs no measurement originally is also covered by a sent SRS, which leads to a waste of resources.

SUMMARY

Embodiments of the present invention provide a method for triggering a terminal to send a sounding reference signal, a terminal, and a base station, which may meet different measurement requirements flexibly.

A method for triggering a terminal to send a sounding reference signal includes:

obtaining requirement information of measurement, where the requirement information includes a position and a bandwidth of a frequency band to be measured;

selecting a resource for the terminal in at least two preset resource patterns according to the requirement information, where multiple types of resource information are preset in each resource pattern of the at least two preset resource patterns to indicate a resource; and triggering the terminal to utilize the selected resource to send the sounding reference signal.

A method for receiving a trigger and sending a sounding reference signal includes:

receiving a trigger from a base station;

selecting a resource in at least two preset resource patterns according to the trigger, where multiple types of resource information are preset in each resource pattern of the at least two preset resource patterns to indicate a resource; and sending the sounding reference signal according to the selected resource.

A base station includes:

an obtaining unit, configured to obtain requirement information of measurement, where the requirement information includes a position and a bandwidth of a frequency band to be measured;

a selecting unit, configured to select a resource for a terminal in at least two preset resource patterns according to the requirement information, where multiple types of resource information are preset in each resource pattern of the at least two preset resource patterns to indicate a resource; and a triggering unit, configured to trigger the terminal to utilize the selected resource to send a sounding reference signal.

A terminal includes:

a triggered unit, configured to receive a trigger from a base station;

a selecting unit, configured to select a resource in at least two preset resource patterns according to the trigger, where multiple types of resource information are preset in each resource pattern of the at least two preset resource patterns to indicate a resource; and a sending unit, configured to send a sounding reference signal according to the resource selected by the selecting unit.

In the embodiments of the present invention, different resource patterns are preset according to different measurement requirements; after the requirement information of the measurement is obtained, the resource is selected from the preset resource patterns for the terminal that needs to be triggered, according to the requirement information; and the selected resource is utilized to trigger the terminal to send the SRS. In this solution, different measurement requirements have their corresponding resource information, and therefore, it is more flexible during resource matching, different measurement requirements may be met, and high PDCCH overhead or a waste of resources that occurs in the prior art is avoided.

BRIEF DESCRIPTION OF THE DRAWINGS

To describe the technical solutions in the embodiments of the present invention or in the prior art more clearly, accompanying drawings involved in the description of the embodiments or the prior art are briefly introduced in the following. Apparently, the accompanying drawings in the following description are merely some embodiments of the present invention, and persons of ordinary skill in the art may further obtain other drawings according to these accompanying drawings without making creative efforts.

DETAILED DESCRIPTION

The technical solutions in the embodiments of the present invention are clearly and completely described in the following in conjunction with the accompanying drawings in the embodiments of the present invention. Evidently, the embodiments to be described are merely part of rather than all of the embodiments of the present invention. Based on the embodiments of the present invention, all other embodiments obtained by those of ordinary skill in the art without making creative efforts shall fall within the protection scope of the present invention.

The embodiments of the present invention provide a triggering method, a terminal, and a base station, which are described in detail in the following.

Embodiment 1

This embodiment provides a description from the perspective of a base station. The base station may be specifically an evolved NodeB, or another entity having similar functions.

A triggering method includes: obtaining requirement information of measurement; selecting a resource from preset resource patterns for a terminal, which needs to be triggered, according to the obtained requirement information, where resource information corresponding to various types of requirement information is preset in the resource patterns; and utilizing the selected resource to trigger the terminal to send an SRS.

Figure 1:
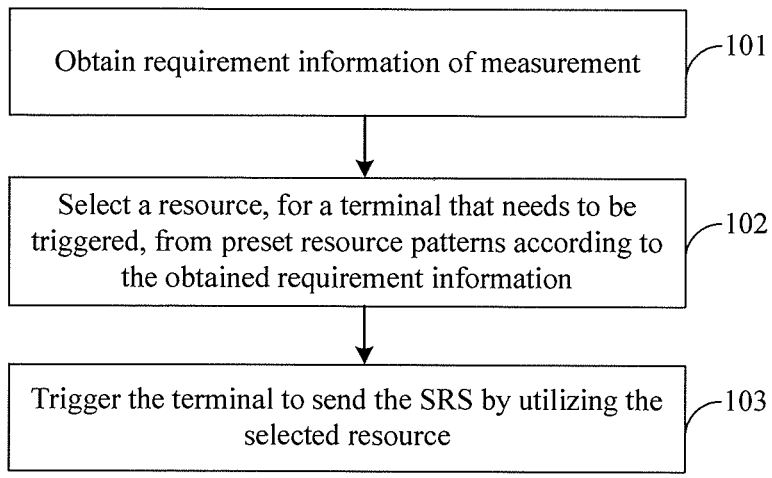
FIG. 1 is a flowchart of a triggering method according to a first embodiment of the present invention.

Referring to FIG. 1, a specific process may be as follows:

101: Obtain requirement information of measurement, where the requirement information may specifically include a position and a bandwidth of a frequency band to be measured, and optionally, may also include measurement delay, the number of the required triggering PDCCHs, a measurement quality requirement (such as signal-to-noise ratio), and so on.

102: Select a resource, for a terminal that needs to be triggered, from preset resource patterns according to the requirement information obtained in step 101.

For example, a resource pattern may be selected from multiple preset resource patterns according to the requirement information, and a resource is selected from the selected resource pattern for the terminal, which needs to be triggered, according to the requirement information.

The selecting, for the terminal that needs to be triggered, a resource from the selected resource pattern according to the requirement information may specifically as follows:

Calculating a matching coefficient according to the obtained position and bandwidth of the measurement, performing weighted merger on the number of the required triggering PDCCHs, delay of finishing this measurement, and the matching coefficient to obtain a weighted merger result, and finally selecting, for the terminal that needs to be triggered, a resource by searching the selected resource pattern and according to the weighted merger result.

Resource information corresponding to various types of requirement information is preset in the resource patterns. That is, corresponding resource information is configured for different requirement information. For example, a user may preset the information on a base station directly according to practical application requirements, or another device may also preset the information for a base station. The resource information is used to indicate resources, and the base station may find corresponding resources according to the resource information.

The resource information may include information, such as time information, a duration, bandwidth information, frequency band information, and frequency hopping information, and may further include information, such as cyclic shift information and comb information. In practical application, resources corresponding to different resource patterns may be placed on different subframes, and the resources corresponding to different resource patterns may also be placed on the same subframe. Therefore, selecting a resource may be regarded as selecting, for the terminal that needs to be triggered, a subframe used for sending an SRS.

When the resources corresponding to different resource patterns are placed on the same subframe, namely, the resources corresponding to multiple resource patterns are applied to the subframe used for sending the SRS, the base station may indicate, to the terminal, which resource pattern is corresponding to the selected resource in the multiple resource patterns. When the resources corresponding to different resource patterns are placed on different subframes, namely, the resources corresponding to different resource patterns are applied to different subframes, the terminal may determine, according to a subframe to which the selected resource is applied, a unique set of resources on the subframe as the selected resource.

The duration here refers to the number that the terminal needs to send the SRS after the terminal is triggered. Specific parameter values of the resource information in different resource patterns may be the same, and may also be different (may be completely different, and may also be partially different), and may be staggered with each other in a time domain, namely, only one resource pattern exists on the same subframe.

103: Trigger the terminal to send the SRS by utilizing the resource selected in step 102.

Specifically, the subframe selected in step 102 may be notified to the terminal, so that the terminal uses this subframe to send the SRS.

If the resources of different resource patterns are placed on different subframes, namely, only one resource pattern exists on each subframe, the terminal learns which resource pattern and which parameters are used for sending as long as the terminal learns on which subframe it is triggered. If the resources of different resource patterns are placed on the same subframe, for example, resources corresponding to two different resource patterns are placed on the same subframe, the terminal learns on which subframe it is triggered, but still cannot determine which resource pattern on the subframe should be used. Therefore, in this case, the base station not only needs to notify these subframes to the terminal, but also needs to indicate a resource pattern that needs to be used by the terminal, so that the terminal selects a corresponding resource pattern on these subframes according to the indication, and sends the SRS by using a resource corresponding to this resource pattern. That is to say, when a subframe includes resources corresponding to at least two resource patterns, the method further includes: indicating, to the terminal, a resource pattern used for sending the sounding reference signal on these subframes. Certainly, if only one resource pattern exists on one subframe, this method may not include the foregoing indicating process.

In order to reduce the load of indication information, when resource patterns are configured, it may be taken into consideration that the number of resources corresponding to resource patterns that occur simultaneously on the same subframe is reduced. For example, 4 resource patterns are configured for one terminal, but resources corresponding to at most two resource patterns occur on each subframe. In this case, 1 bit may be used to indicate the specifically selected resource pattern.

It can be learned from the foregoing that, in this embodiment, different resource patterns are preset according to different measurement requirements; after the requirement information of the measurement is obtained, the resource is selected from the preset resource patterns for the terminal that needs to be triggered, according to the requirement information; and the selected resource is utilized to trigger the terminal to send the SRS. In this solution, different measurement requirements have their corresponding resource information, and therefore, it is more flexible during resource matching, different measurement bandwidth requirements may be met, and high PDCCH overhead or a waste of resources that occurs in the prior art is avoided.

Embodiment 2

On the basis of the first embodiment, besides presetting at least one resource pattern on a base station, these resource patterns also need to be configured for a terminal. Specifically, a user may perform configuration on the terminal directly, and the base station may also perform configuration on the terminal through higher-layer signaling. That is, before the terminal is triggered, the triggering method may further include:

Configuring at least one preset resource pattern for a terminal through higher-layer signaling.

In this way, after triggered by a base station, the terminal may determine a needed resource pattern in multiple resource patterns according to the trigger time, and determine a resource in this resource pattern, and then use the determined resource to send an SRS.

Resource information corresponding to various types of requirement information is preset in the resource patterns. That is, corresponding resource information is configured for different requirement information. The resource information may include time information, a duration, bandwidth information, information of a frequency band which the SRS locates on, and frequency hopping information, information of a used cyclic shift, and information of a used comb. The base station may find a corresponding resource through the resource information. The duration refers to a period in which a trigger operation keeps effective after the terminal is triggered, namely, the number that the terminal needs to send the SRS.

For example, the step of configuring the preset resource patterns for the terminal through higher-layer signaling may specifically be any one of the following manners:

(1) Configure resource information in each resource pattern for the terminal through higher-layer signaling.

For example, respectively configure time information, a duration, bandwidth information, information of a frequency band where the SRS locates on, frequency hopping information, information of a used cyclic shift, and information of a used comb, which correspond to each resource pattern, for the terminal through higher-layer signaling; or (2) If there are same resource information and different resource information among resource patterns, namely, part of resource information in different resource patterns are the same, in order to save overhead of configuration signaling, one copy of the same resource information may be sent to the terminal through higher-layer signaling, and the different resource information is respectively configured for the terminal through higher-layer signaling.

For example, if the cyclic shift used by each resource pattern is the same and the comb used by each resource pattern is the same, only one copy of cyclic shift information and comb information may be sent to the terminal. Meanwhile, other resource information is configured for the terminal separately, that is, one copy of corresponding cyclic shift information and comb information may be sent to the terminal through higher-layer signaling, and time information, a duration, bandwidth information, information of a frequency band where the SRS locates on, and frequency hopping information, which correspond to each bandwidth, may be configured for the terminal respectively through higher-layer signaling.

The "before the terminal is triggered" mentioned here refers to any time before the terminal is triggered, for example, before step 103, or before step 101.

It can be learned from the foregoing that, in this embodiment, multiple resource patterns are preset in both the base station and the terminal. Resource information corresponding to various types of requirement information is preset in the resource patterns. After obtaining requirement information of measurement, the base station may select, for the terminal that needs to be triggered, a proper resource from at least one preset resource pattern according to the requirement information. Afterward, the selected resource is utilized to trigger the terminal, so that after triggered, the terminal may find the corresponding resource according to the preset resource pattern to send the SRS. In this solution, different measurement requirements have their corresponding resource information. Therefore, it is more flexible during resource matching, and different measurement requirements may be met, and high PDCCH overhead or a waste of resources that occurs in the prior art is avoided.

When the at least two preset resource patterns are configured for the terminal through the higher-layer signaling, the resource patterns may also be categorized according to the terminal. For example, part of multiple resource patterns may be set for multiple terminals uniformly, and the other part of the multiple resource patterns may be set for each terminal. In this case, the base station may, by means of broadcast through higher-layer signaling, notify the multiple terminals of the part of resource patterns uniformly set for the multiple terminals; and the base station may, by means of unicast through higher-layer signaling, notify each terminal of the other part of resource patterns set for each terminal. In practical application, the base station may include many resource patterns, and multiple resource patterns may be allocated to each terminal. However, different terminals may have one or multiple same resource patterns. When configuring the resource patterns for the multiple terminals, the base station may notify the same resource patterns of the multiple terminals to the multiple terminals by means of broadcast, and does not need to send the same resource pattern to multiple terminals for many times by means of unicast.

Embodiment 3

This embodiment provides a description from the perspective of a terminal.

A triggering method includes: receiving a trigger from a base station; selecting a resource from preset resource patterns according to the trigger; and sending an SRS according to the selected resource, where multiple bandwidths and resource information corresponding to each bandwidth are preset in the resource patterns.

Figure 2:
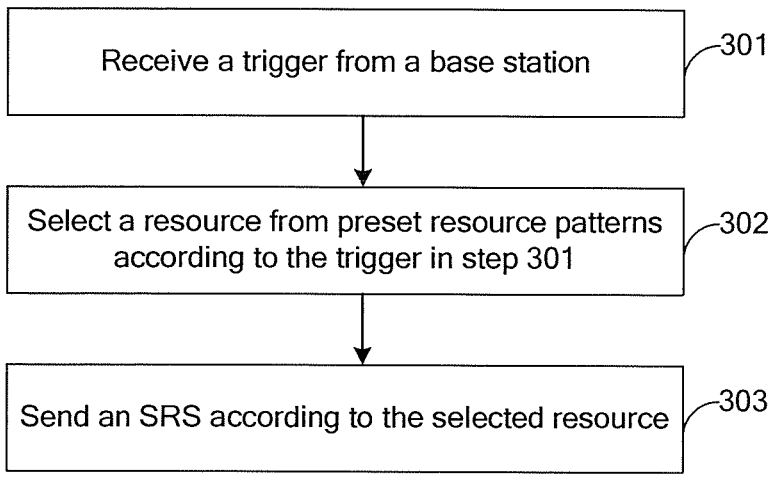
FIG. 2 is a flowchart of a triggering method according to a third embodiment of the present invention.

Referring to FIG. 2, a specific process may be as follows:

301: Receive a trigger from a base station.

302: Select a resource from preset resource patterns according to the trigger in step 301.

For example, a subframe number may be determined according to the trigger in step 301, a resource pattern is determined in multiple preset resource patterns according to the determined subframe number, and then a resource is selected in the determined resource pattern.

Resource information corresponding to various types of requirement information is preset in the multiple preset resource patterns. That is, corresponding resource information is configured for different requirement information. The resource information may include information, such as time information, a duration, bandwidth information, frequency band information, and frequency hopping information, and may further include information, such as cyclic shift information, and comb information.

In the embodiment of the present invention, the duration refers to the number that the terminal needs to send the SRS after the terminal is triggered. Specific configuration parameters in different resource patterns may be different. For example, durations in different resource patterns are different: A duration of a resource pattern A is 4, while a duration of a resource pattern B is 2. Moreover, different resource patterns are staggered with each other in a time domain. That is, only one resource pattern exists on the same subframe.

In practical application, resources corresponding to different resource patterns may be placed on different subframes, and the resources corresponding to different resource patterns may also be placed on the same subframe.

If the resources corresponding to different resource patterns are placed on different subframes, namely, only one resource pattern exists on each subframe, the terminal learns which resource pattern and which resources in this resource pattern are used for sending as long as the terminal learns on which subframe it is triggered.

If the resources corresponding to different resource patterns are placed on the same subframe, for example, resources corresponding to two resource patterns are placed on the same subframe, the terminal learns on which subframe it is triggered, but still cannot determine which resource pattern on the subframe should be used. Therefore, in this case, the terminal also needs to receive an indication which is sent by the base station and is about which resource pattern needs be used by the terminal, so that the terminal selects a corresponding resource on these subframes according to the indication to send the SRS. That is to say, when one subframe includes the resources corresponding to at least two types of bandwidth, the triggering method may further include:

receiving an indication which is sent by the base station and is about a resource pattern, where the resource pattern exists on a subframe and is used to send an SRS.

In this case, specifically, the "determining a resource pattern in the multiple preset resource patterns according to the subframe number" is: determining a subframe according to the subframe number, and determining a resource pattern in the at least two resource patterns corresponding to this subframe according to the received indication.

If only one type of bandwidth exists on the subframe, the triggering method may not include the foregoing indicating process.

303: Send an SRS according to the selected resource. For a specific process of sending the SRS, reference may be made to the prior art, and details are not repeatedly described here.

In the foregoing triggering method, the resource pattern may be preset by a user on the terminal directly according to practical application requirements; or may also be preset by the base station for the terminal through higher-layer signaling. That is, optionally, before the terminal is triggered, the triggering method may further include:

receiving configuration that is performed by the base station on the resource patterns through the higher-layer signaling, where there is at least one resource pattern. Specifically, anyone of the following manners may be applied:

(1) Receive resource information in each resource pattern, where the resource information in each resource pattern is sent by the base station through higher-layer signaling; and then configure each resource pattern according to the received resource information.

For example, time information, a duration, information of a frequency band which the SRS locates on, frequency hopping information, information of a used cyclic shift, and information of a used comb, which correspond to each resource pattern and are sent by the base station through higher-layer signaling, are received; and each resource pattern is configured according to the time information, the duration, the information of a frequency band which the SRS locates on, the frequency hopping information, the information of the used cyclic shift, and the information of the used comb that correspond to each resource pattern; or (2) If there are same resource information and different resource information among resource patterns, namely, part of resource information in different resource patterns is the same, in order to save overhead of configuration signaling, one copy of the same resource information sent by the base station through the higher-layer signaling is received, and different resource information separately sent by the base station through the higher-layer signaling are received; all resource patterns are configured according to the received same resource information, and each resource pattern is configured according to the received different resource information.

For example, if the cyclic shift used by each bandwidth is the same and the comb used by each bandwidth is the same, the receiving the configuration performed by the base station on the resource patterns through the higher-layer signaling may include:

receiving a copy of cyclic shift information and comb information sent by the base station through the higher-layer signaling, and receiving the time information, the duration, bandwidth information, the frequency band information, and the frequency hopping information that correspond to each bandwidth and are sent by the base station through the higher-layer signaling;

configuring all resource patterns according to the cyclic shift information and comb information; and configuring each resource pattern according to the time information, the duration, the bandwidth information, the frequency band information, and the frequency hopping information that correspond to each bandwidth.

It can be learned from the foregoing that, in this embodiment, at least one resource pattern is preset in the terminal, and corresponding resource information is separately preset in the preset resource patterns according to different measurement requirements. After triggered by the base station, the terminal may select a resource in the preset resource patterns according to the trigger, and utilize the selected resource to send an SRS. In this solution, multiple resource patterns are preset in the terminal, and resource information corresponding to each measurement requirement exists in the resource patterns. Therefore, it is more flexible during resource matching, and different measurement bandwidth requirements may be met, and high PDCCH overhead or a waste of resources that occurs in the prior art is avoided.

Embodiment 4

According to the methods described in the first, second and third embodiments, the following further provides a detailed description by taking an example that the base station is an eNodeB. Besides, for ease of description, in the embodiment of the present invention, an example that two resource patterns are configured at the eNodeB is taken for description. It should be understood that, the number of resource patterns may be adjusted according to practical application requirements.

First, two resource patterns need to be preset for the eNodeB. The two resource patterns have different resource information corresponding to different measurement requirements. In this way, for different measurement requirements, the eNB may select, according to requirement information of measurement, one type of the resource information for measuring, so as to improve flexibility. The resource information may include time information, a duration, bandwidth information, information of a frequency band the SRS locates on, frequency hopping information, information of a used cyclic shift, and information of a used comb. Certainly, the two resource patterns may be staggered with each other in a time domain, and therefore, only one resource pattern exists on the same subframe. In this way, it may be determined that which resource pattern needs to be used as long as the subframe is determined.

Figure 3:
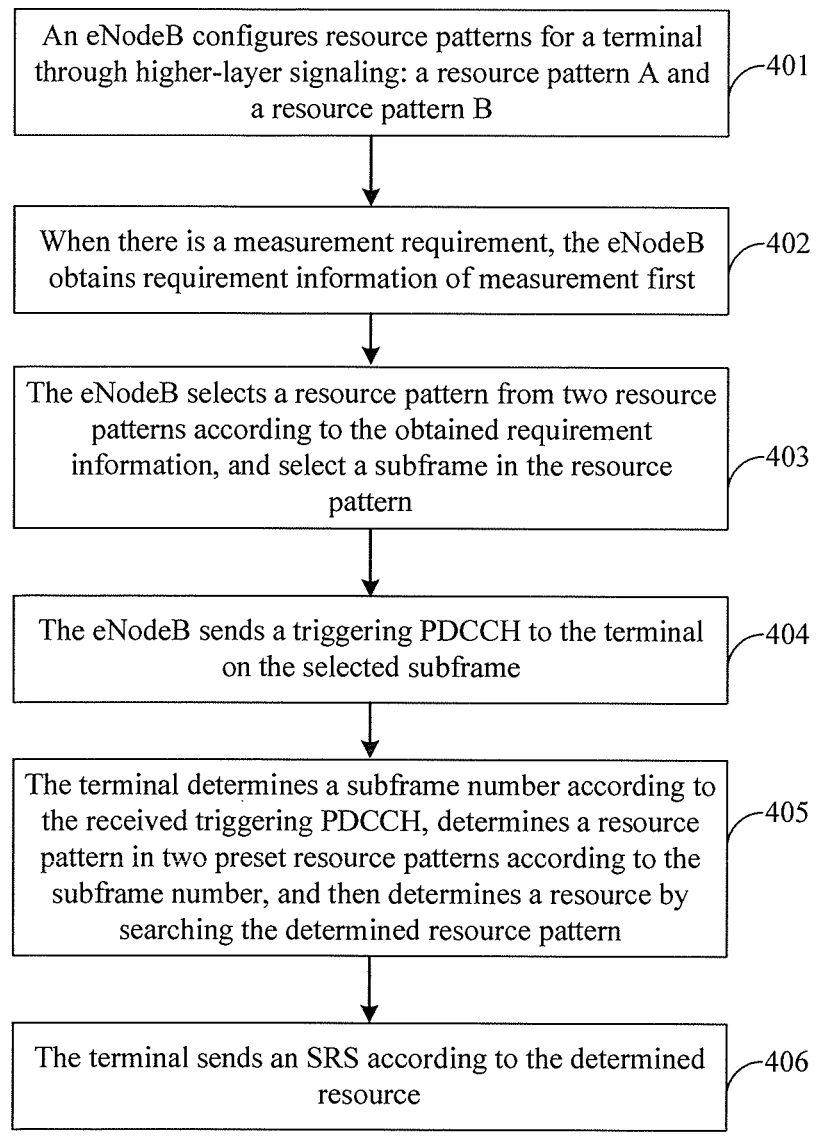
FIG. 3 is a flowchart of a triggering method according to a fourth embodiment of the present invention.

Referring to FIG. 3, a specific process may be as follows:

401: An eNodeB configures resource patterns for a terminal through higher-layer signaling, and specifically, may configure two locally-preset resource patterns for the terminal.

For example, the eNodeB configures a resource pattern A and a resource pattern B for the terminal. Configuration information of the resource pattern A may include:

time information, a duration, bandwidth information, frequency band information, frequency hopping information, information of a used cyclic shift, and information of a used comb.

Here, it is assumed that a bandwidth in the resource pattern A is W1, and a duration is 1.

Configuration information of the resource pattern B may include:

time information, a duration, bandwidth information, frequency band information, frequency hopping information, information of a used cyclic shift, and information of a used comb.

Here, it is assumed that a bandwidth in the resource pattern B is W2, and a duration is 4.

In practical application, part of resource information in different resource patterns may be configured as the same value. In this way, only one copy of the resource information of the same value needs to be transmitted. For example, if the same cyclic shift and the same comb are used, only one copy of cyclic shift information and comb information needs to be transmitted, so as to reduce signaling overhead.

Figure 4:
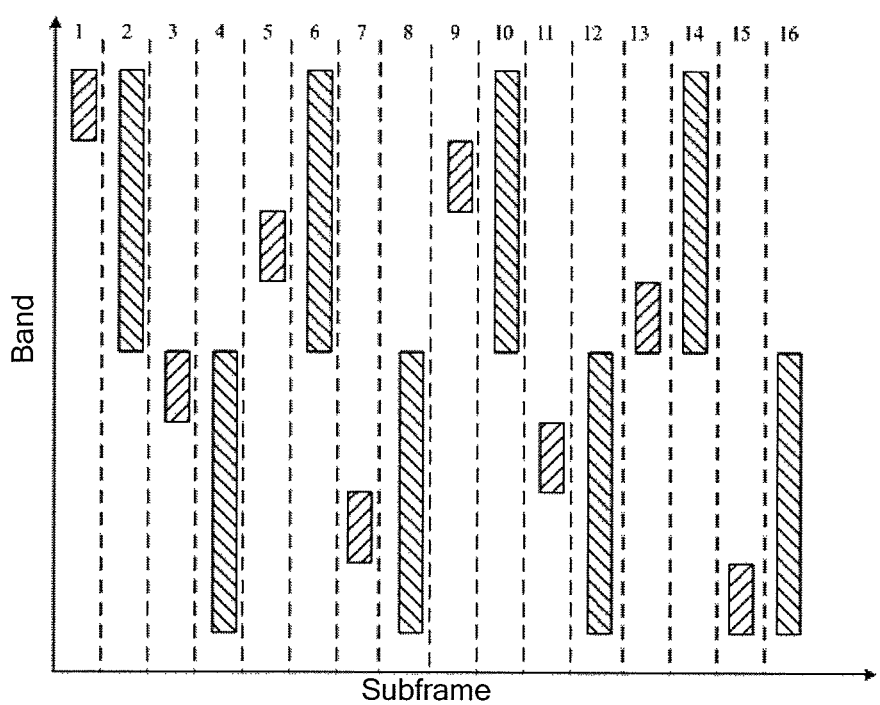
FIG. 4 is a schematic diagram of a scenario of configuring a bandwidth according to an embodiment of the present invention.

For example, referring to FIG. 4, two different types of bandwidth are configured here, where a right slant (namely, long) diamond indicates the bandwidth of w1, and a left slant (namely, short) diamond indicates the bandwidth of w2. The vertical direction of the diagram represents a frequency band, and the horizontal direction represents a subframe (namely, equivalent to time). Numbers 1 to 16 on the upper side of the diagram are numbers of subframes.

402: When there is a measurement requirement, the eNodeB obtains requirement information of measurement first, and then performs step 403. The requirement information may specifically include a position and a bandwidth of a frequency band to be measured, and may also include measurement delay, the number of the required triggering PDCCHs, a measurement quality requirement, and so on.

403: The eNodeB finds two preset resource patterns of a corresponding terminal according to the requirement information obtained in step 402, selects a resource pattern from the two resource patterns according to the requirement information, and then selects a resource in the selected resource pattern, namely, selects a subframe in the resource pattern. During selection, a best subframe may be selected, or multiple subframes, namely, a combination of subframes, may also be selected according to a preset rule.

For example, if the base station requires that the terminal may send an SRS for 4 consecutive times after the terminal is triggered, the base station may select the resource pattern B (because the duration of the resource pattern B is 4, which indicates that the terminal may send the SRS for 4 consecutive times after triggered), and then select a proper subframe in the resource pattern B according to the requirement information obtained in step 402.

Figure 5:
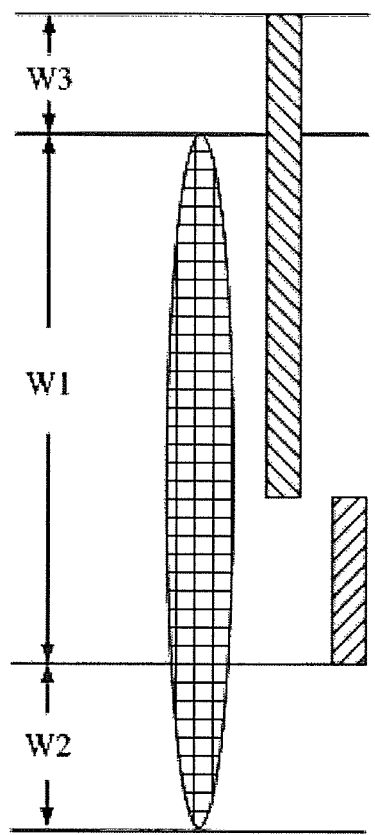
FIG. 5 is a schematic diagram of a scenario of an actually-required bandwidth and of configuring a bandwidth according to an embodiment of the present invention.

The preset rule mentioned here may be set according to practical application requirements. For example, the criteria for selecting the subframe may be set according to different service requirements, which may be, referring to FIG. 5, as follows:

If resources on two subframes in FIG. 5 are used for sending the SRS, the part of the bandwidth W1 in the bandwidth to be measured is covered, but the bandwidth W2 is not covered, and besides, a bandwidth W3 in a bandwidth that is not to be measured is covered (namely, wasted part). In this case, the eNodeB may calculate a matching coefficient x for the selected subframe:

$$x = a\frac{W_1}{W_1 + W_2} - b\frac{W_2}{W_1 + W_2} - c\frac{W_3}{W_1 + W_2}$$

a, b, and c are weight coefficient, and are all positive numbers, and may be set differently according to specific conditions.

After calculating the matching coefficient, the eNodeB performs weighted merger on the number of the required triggering PDCCHs, delay of this measurement and the matching coefficient x to obtain a weighted merger result, and then selects, for the terminal that needs to be triggered, a subframe that needs to be used, according to the weighted merger result and by searching the selected resource pattern.

For example, It may be as follows:

The eNodeB calculates the following metric value for the selected subframes or the combination of subframes. The metric value is the weighted merger result:

$$M = l*x - m*N\_PDCCH - n*delay$$

x is goodness of fit, N_PDCCH is the number of the triggering PDCCHs, delay is delay of finishing the measurement, and l, m, and n are weight coefficients and are all positive.

After the M value is calculated, the eNodeB selects a subframe with the highest M value or a combination of such subframes with the highest M value.

404: The eNodeB sends a triggering PDCCH to the terminal on the selected subframe.

For example, if the eNodeB selects an $x^{th}$ subframe in step 403, the eNodeB sends the triggering PDCCH to the terminal on the $x^{th}$ subframe.

Specifically, on the PDCCH, a 1-bit information bit may be used to indicate whether the terminal is triggered. For example, "0" indicates that the terminal is not triggered, and "1" indicates that the terminal is triggered, and so on. Reference may be made to the prior art for details, which are not repeatedly described here.

It should be noted that, in practical application, resources corresponding to different resource patterns may be placed on different subframes, and may also be placed on the same subframe.

If the resources corresponding to different resource patterns are placed on different subframes, namely, only one resource corresponding to one resource pattern is placed on each subframe, the terminal learns which resource pattern and which resources in this resource pattern are used for sending as long as the terminal learns on which subframe it triggered.

If the resources of different bandwidths are placed on the same subframe, namely, resources corresponding to at least two resource patterns are placed on each subframe, the terminal learns on which subframe it is triggered, but still cannot determine which resource pattern on the subframe should be used. Therefore, in this case, the base station not only needs to notify these subframes to the terminal, but also needs to indicate, in the triggering PDCCH, a resource pattern that needs to be used by the terminal, so that the terminal may select a corresponding resource pattern on the subframes according to the indication, and select, according to the resource pattern, a proper resource for sending the SRS.

For example, specifically, a newly-added information bit in the triggering PDCCH may be used to indicate which resource is used by the terminal to send the SRS. For example, sending 0 indicates that the terminal is allowed to use the resource of the resource pattern A, and sending 1 indicates that the terminal is allowed to use the resource of the resource pattern B.

As mentioned above, although the resources of different resource patterns may be placed on the same subframe, it is best to ensure that the number of resource patterns coexistent on each subframe is less than the total number of resource patterns. For example, the base station configures 4 resource patterns for one terminal, and then through configuration, resources corresponding to at most 2 resource patterns exist on each subframe. The benefit of such configuration is: Only a few bits need to be used for indicating which resource pattern is corresponding to the resource that needs to be used for sending the SRS.

The resource corresponding to one resource pattern may also be placed on part of subframes, and the resources corresponding to at least two resource patterns are placed on part of the subframes. In this case, the resource pattern that needs to be used by the terminal still needs to be indicated in the triggering PDCCH. That is to say, if the resource corresponding to only one resource pattern exists on each subframe under the configured resource patterns, after triggered, the terminal may determine directly, according to the subframe number, the resource pattern used for sending the SRS. In this case, it is unnecessary to indicate the resource pattern that needs to be used by the terminal. If under the configured resource patterns, there is a subframe includes resources corresponding to at least two resource patterns, it is necessary to indicate the resource pattern that needs to be used by the terminal. In this way, after triggered, the terminal may find the corresponding resource pattern according to the indication.

In this step, the base station may send a triggering PDCCH on a trigger subframe to the terminal, so as to trigger the terminal to utilize the selected resource to send the sounding reference signal. The trigger subframe is used to indicate, to the terminal, a subframe to which the selected resource is applied. In this way, after receiving the triggering PDCCH, the terminal can determine the subframe to which the selected resource is applied, according to the subframe to which the triggering PDCCH is applied. For details of this process, reference may be made to a subsequent fifth embodiment.

405: After receiving the triggering PDCCH, the terminal determines the subframe number according to the received triggering PDCCH, determines a resource pattern in two preset resource patterns according to the subframe number, and then determines a resource by searching the determined resource pattern.

For example, if the resource pattern determined by the terminal here is the resource pattern B, the terminal searches the resource pattern B to determine the needed resource.

A specific searching manner may be that searching is performed according to a preset searching rule. For example, if the terminal receives the triggering PDCCH on the $x^{th}$ subframe, the terminal may search for a resource on an $(x+N)^{th}$ subframe, where N is processing delay, and is a value learned by both the eNodeB and the terminal. For example, if N=4, the terminal searches for a resource on an $(x+4)^{th}$ subframe.

406: The terminal sends the SRS according to the resource determined in step 405.

For example, in step 405, the terminal selects the resource in the resource pattern B, and then the terminal sends the SRS for 4 times according to the selected resource because the duration of the selected resource is 4.

For example, the terminal should send the SRS on 4 subframes, which are with resources available for allocation and follow a $(x+N)^{th}$ subframe.

It can be learned from the foregoing that, in this embodiment, two resource patterns are preset in both the base station and the terminal, and the corresponding resource information is preset in the preset resource patterns according to different measurement requirements. After obtaining the requirement information of the measurement, the base station may determine the resource pattern according to the requirement information, and search the determined resource pattern to select the proper resource for the terminal that needs to be triggered. Afterward, the base station triggers the terminal according to the selected resource, so that the terminal finds a proper resource pattern in the two preset resource patterns after triggered, and in this selected resource pattern, the corresponding resource is found for sending the SRS. In this solution, different measurement requirements have their corresponding resource information, and therefore, it is more flexible during resource matching, different measurement requirements may be met, and high PDCCH overhead or a wastes of resources that occurs in the prior art is avoided. Moreover, the resource information further includes the duration. Therefore, as triggered once, the terminal may send the SRS for many times, which may reduce the number of the triggering PDCCHs, so as to further reduce the overhead of the triggering PDCCHs on the whole.

Embodiment 5

It is pointed out in step 404 in the fourth embodiment that, if a subframe selected by an eNodeB is an $x^{th}$ subframe, the eNodeB sends a triggering PDCCH on the $x^{th}$ subframe. Besides, instead of sending the triggering PDCCH on the $x^{th}$ subframe, the eNodeB may send the triggering PDCCH on a $k^{th}$ subframe. In this case, however, the eNodeB needs to notify the subframe selected in step 404 to a terminal by other means, so that the terminal may learn to which subframe a triggered SRS should be applied.

The subframe to which the triggering PDCCH received by the terminal is applied is a trigger subframe. The trigger subframe is used to indicate, to the terminal, a subframe to which the selected resource is applied. The subframe to which the selected resource is applied may be an $N^{th}$ subframe after the trigger subframe, where N is a positive integer. Alternatively, indication information may be added in the PDCCH to indicate the subframe to which the selected resource is applied.

For example, the eNodeB may add an information bit in the triggering PDCCH to indicate to which subframe the triggered SRS should be applied, as detailed below:

If a 2-bit information bit is added in the triggering PDCCH to indicate to which subframe the triggered SRS should be applied, the following mapping manner may be used to indicate on which subframe the terminal sends an SRS. Refer to Table 1.

TABLE 1

| Information bit | Subframe for sending an SRS |
| --- | --- |
| 00 | A first subframe with resources available for allocation starting from a $(k + N)^{th}$ subframe |
| 01 | A second subframe with resources available for allocation starting from a $(k + N)^{th}$ subframe |
| 10 | A third subframe with resources available for allocation starting from a $(k + N)^{th}$ subframe |

TABLE 1-continued

| Information bit | Subframe for sending an SRS |
| --- | --- |
| 11 | A fourth subframe with resources available for allocation starting from a $(k + N)^{th}$ subframe |

For example, if the terminal receives the triggering PDCCH on a $k^{th}$ subframe, and the information bit which is used to indicate "to which subframe the triggered SRS should be applied" and is in this triggering PDCCH is "00", the terminal may acquire, from Table 1, that a first subframe that is with resources available for allocation and starts from a $(k+N)^{th}$ subframe is a subframe selected by the eNodeB. Therefore, the terminal obtains a resource according to this subframe, and sends the SRS according to the resource, and the rest may be deduced by analogy.

Other steps of this embodiment are the same as those of the fourth embodiment, and are not repeatedly described here.

It should be noted that, in all embodiments of the present invention, the described resources used for measurement may be resources applied to conventional periodical SRS resources of LTE, and may also be resources newly added on LTE-A. For example, the measurement may be performed by utilizing a reserved resource block (resource block), or the measurement may be performed by using a redundant cyclic shift of DMRS, and so on.

It can be learned from the foregoing that, this embodiment not only may implement the same beneficial effects as those in the fourth embodiment, but also further provides another manner of making the terminal acquire the subframe selected by the eNodeB. Therefore, it is ensured that, in any scenario, the terminal may acquire the subframe selected by the eNodeB, and it is avoided that the terminal cannot determine the subframe accurately when the eNodeB cannot send the triggering PDCCH on the $x^{th}$ subframe for certain reasons.

Embodiment 6

Figure 6A:
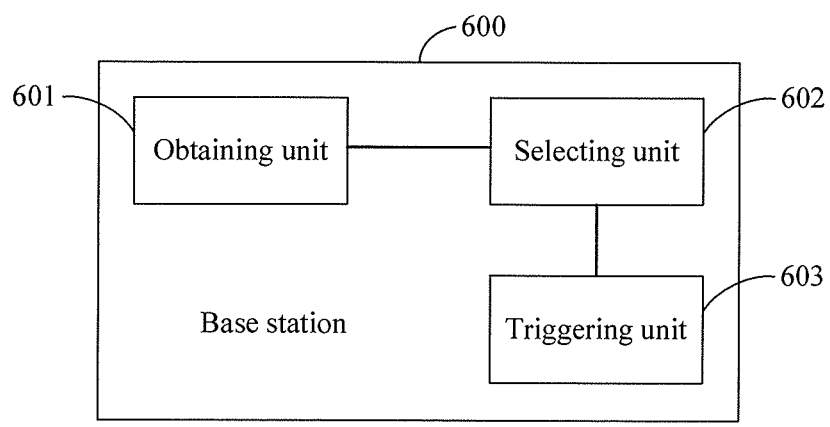
FIG. 6a is a schematic structural diagram of a base station according to an embodiment of the present invention.

To better implement the foregoing methods, the embodiment of the present invention provides a base station 600. As shown in FIG. 6a, the base station 600 includes an obtaining unit 601, a selecting unit 602, and a triggering unit 603.

The obtaining unit 601 is configured to obtain requirement information of measurement, where the requirement information may specifically include a position and a bandwidth of a frequency band to be measured, and optionally, may further include measurement delay, the number of the required triggering PDCCHs, a measurement quality requirement (such as signal-to-noise ratio), and so on. The obtaining unit 601 may be an interface.

The selecting unit 602 is configured to select a resource, for a terminal that needs to be triggered, in preset resource patterns according to the requirement information obtained by the obtaining unit 601, where resource information corresponding to various types of requirement information is preset in the resource patterns, namely, corresponding resource information is configured for different requirement information. For example, a user may preset the information on the base station directly according to practical application requirements, or another device may preset the information for the base station. The resource information is used to indicate resources, and the selecting unit 602 may find corresponding resources according to the resource information. The selecting unit 602 may be a processor.

The resource information may include time information, a duration, bandwidth information, frequency band information, and frequency hopping information, and the resource information may further include cyclic shift information and comb information. In practical application, resources of different bandwidths may be placed on different subframes, and the resources of different bandwidths may also be placed on the same subframe. The "selecting a resource" here may be regarded as selecting a subframe; reference may be made to the preceding embodiments for details, and details are not repeatedly described here.

It should be noted that, in the embodiment of the present invention, the duration refers to the number that the terminal needs to send the SRS after the terminal is triggered. Besides, specific parameter values of the resource information in different resource patterns are different (may be completely different, and may also be partially different), and are staggered with each other in a time domain, namely, only one resource pattern exists on the same subframe.

The triggering unit 603 is configured to utilize the resource selected by the selecting unit 602 to trigger the terminal to send an SRS. The triggering unit 603 may be a transmission port.

Besides presetting the resource patterns on the base station, the resource patterns also need to be configured for the terminal. Specifically, a user may perform configuration on the terminal directly, and it may also be the base station that performs configuration on the terminal through higher-layer signaling. That is, as shown in FIG. 6b, the base station may further include a configuring unit 604.

The configuring unit 604 is configured to configure the preset resource patterns for a terminal 700 through higher-layer signaling. Reference may be made to the preceding embodiments for a specific configuring manner, which is not repeatedly described here. The configuring unit 604 may be a port.

Figure 6B:
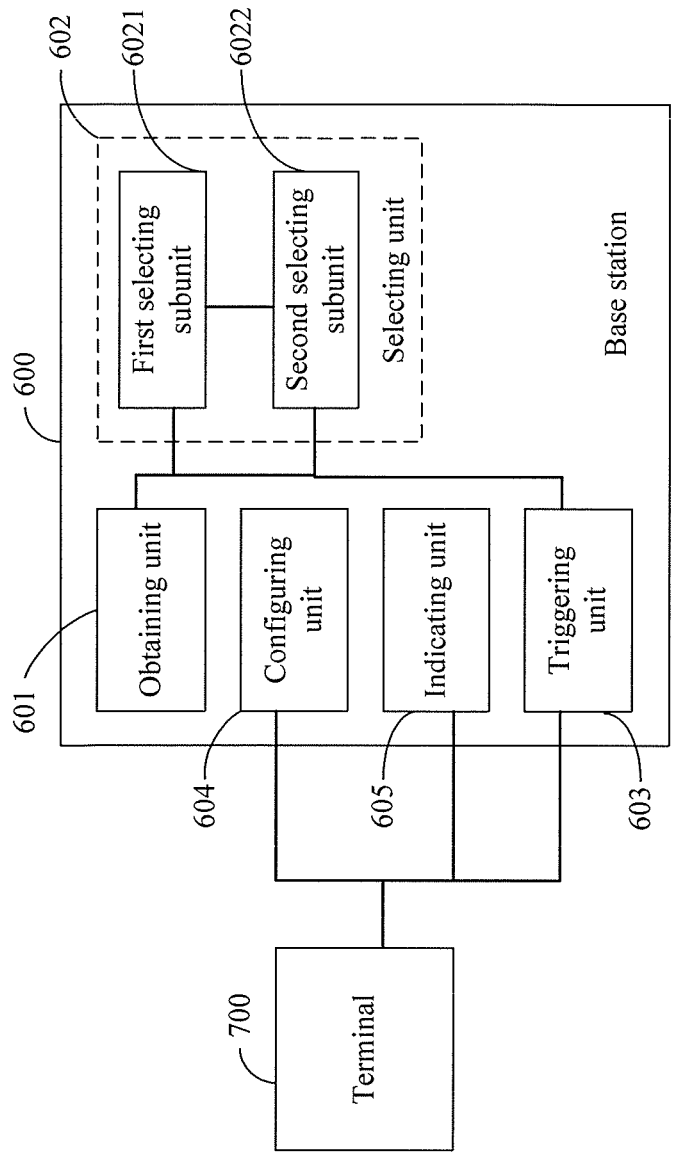
FIG. 6b is another schematic structural diagram of a base station according to an embodiment of the present invention.

It should be noted that, in order to better describe relationships between units, a terminal 700 is further provided in FIG. 6b.

As shown in FIG. 6b, the selecting unit 602 may include a first selecting subunit 6021 and a second selecting subunit 6022, which may be different processor units.

The first selecting subunit 6021 is configured to select a resource pattern from multiple preset resource patterns according to the requirement information obtained by the obtaining unit.

The second selecting subunit 6022 is configured to select, for the terminal that needs to be triggered and according to the requirement information obtained by the obtaining unit 601, a resource in the resource pattern selected by the first selecting subunit 6021.

The requirement information may specifically include a position and a bandwidth for measuring, and may further include measurement delay, the number of the required triggering PDCCHs, a measurement quality requirement, and so on, and then the second selecting subunit 6022 includes a calculating sub-subunit, a processing sub-subunit, and a determining sub-subunit.

The calculating sub-subunit is configured to calculate a matching coefficient according to the position and the bandwidth of the frequency band to be measured, where the position and the bandwidth of the band to be measured are obtained by the obtaining unit 601. Reference may be made to the preceding embodiments.

The processing sub-subunit is configured to perform weighted merger on the number of the required triggering PDCCHs, delay of finishing this measurement, and the matching coefficient that is obtained by the calculating sub-subunit, to obtain a weighted merger result. Reference may be made to the preceding embodiments.

The determining sub-subunit is configured to: select a resource for the terminal that needs to be triggered, according to the weighted merger result obtained by the processing sub-subunit and by searching the resource pattern selected by the first selecting subunit 6021.

As shown in FIG. 6b, if resources corresponding to different resource patterns are placed on the same subframe, a resource pattern that is used for sending the SRS and is on these subframes may also be indicated to the terminal, namely, the base station 600 may further include an indicating unit 605.

The indicating unit 605 indicates the resource pattern that is used for sending the SRS and is on these subframes to the terminal 700, so that the terminal 700 may select a corresponding resource on these subframes according to the notification to send the SRS after the terminal 700 is triggered by the triggering unit.

The base station 600 may specifically be an eNodeB, or another entity with similar functions.

For the specific implementation of each unit above, reference may be made to the preceding embodiments, and details are not repeatedly described here.

It can be learned from the foregoing that, in this embodiment, resource patterns are preset in both the base station 600 and the terminal 700, and the corresponding resource information is preset for different requirement information separately in the preset resource patterns. After the obtaining unit 601 of the base station 600 obtains the requirement information of the measurement, the selecting unit 602 of the base station 600 may select a proper resource for the terminal 700, which needs to be triggered, according to the requirement information and by searching the multiple preset resource patterns, and then the triggering unit 603 utilizes the selected resource to trigger the terminal 700. So that after triggered, the terminal 700 may find the proper resource pattern according to the preset resource patterns, and search the found resource pattern for the corresponding resource for sending the SRS. In this solution, different measurement requirements have their corresponding resource information, and therefore, it is more flexible during resource information matching, different measurement requirements may be met, and high PDCCH overhead or a waste of resources that occurs in the prior art is avoided. Moreover, the resource information further includes the duration. Therefore, as triggered once, the terminal may send the SRS for many times, which may reduce the number of the triggering PDCCHs, so as to further reduce the overhead of the triggering PDCCHs on the whole.

Embodiment 7

Figure 7A:
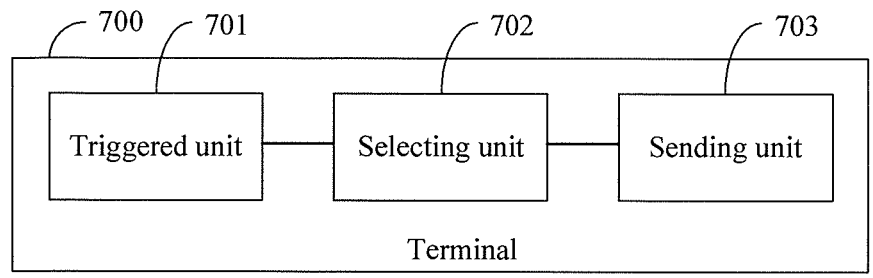
FIG. 7a is a schematic structural diagram of a terminal according to an embodiment of the present invention.

Correspondingly, the embodiment of the present invention further provides a terminal 700. As shown in FIG. 7a, the terminal 700 includes a triggered unit 701, a selecting unit 702, and a sending unit 703.

The triggered unit 701 is configured to receive a trigger from the base station 600, and the triggered unit 701 may be an interface used for receiving a trigger signal.

The selecting unit 702 is configured to select a resource in preset resource patterns according to the trigger received by the triggered unit 701, where resource information corresponding to various types of requirement information is preset in the resource patterns. The selecting unit 702 may be a processor.

The resource information may include time information, a duration, bandwidth information, frequency band information, and frequency hopping information, and may further include cyclic shift information and comb information. The duration refers to the number that the terminal 700 needs to send the SRS after the terminal 700 is triggered. In practical application, resources corresponding to different resource patterns may be placed on different subframes, and the resources corresponding to different resource patterns may also be placed on the same subframe. Besides, it should also be noted that, specific configuration parameters in different resource patterns are different, and different resource patterns are staggered with each other in a time domain. That is, only one resource pattern exists on the same subframe.

The sending unit 703 is configured to send an SRS according to the resource selected by the selecting unit 702. The sending unit 703 may be a transmission port.

The resource patterns may be preset by a user on the terminal directly according to practical application requirements; or may also be preset by the base station 600 for the terminal 700 through higher-layer signaling. That is, optionally, as shown in FIG. 7b, the terminal 700 may further include a configured unit 704.

The configured unit 704 may be another port, and may be configured to receive configuration that is performed by the base station 600 on the resource patterns through the higher-layer signaling, where there is at least one resource pattern.

Therefore, the selecting unit 702 is further configured to select, according to the trigger received by the triggered unit 701, a resource in the resource pattern configured from the configured unit 704.

Figure 7B:
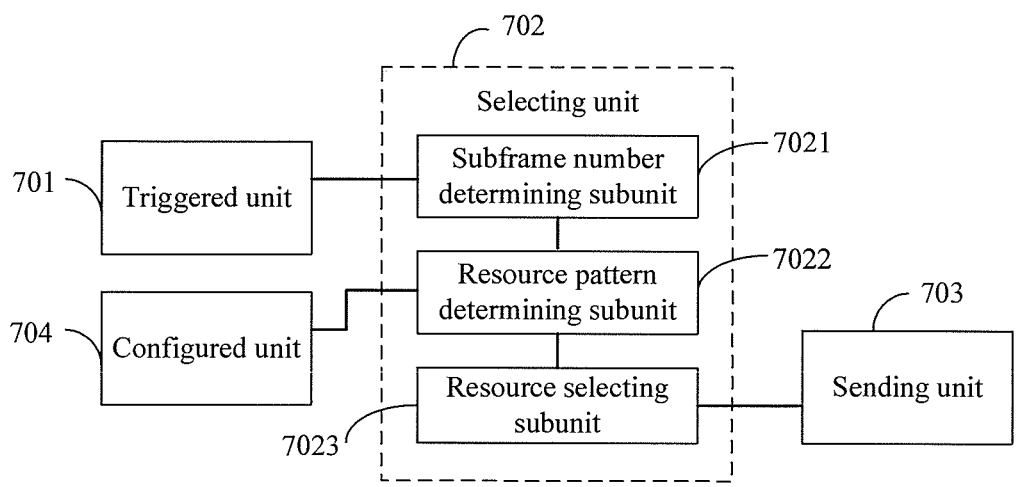
FIG. 7b is another schematic structural diagram of a terminal according to an embodiment of the present invention.

As shown in FIG. 7b, the selecting unit 702 may include a subframe number determining subunit 7021, a resource pattern determining subunit 7022, and a resource selecting subunit 7023, which may be different processor units.

The subframe number determining subunit 7021 is configured to determine a subframe number according to the trigger received by the triggered unit 701.

The resource pattern determining subunit 7022 is configured to determine a resource pattern in multiple preset resource patterns according to the subframe number determined by the subframe number determining subunit 7021, for example, select a resource in at least one resource pattern configured by the configured unit 704 according to the subframe number determined by the subframe number determining subunit 7021.

The resource selecting subunit 7023 is configured to select a resource in the resource pattern determined by the resource pattern determining subunit 7022.

In practical application, the resources corresponding to different resource patterns may be placed on different subframes, and the resources corresponding to different resource patterns may also be placed on the same subframe.

If the resources corresponding to different resource patterns are placed on different subframes, namely, only one SRS resource exists on each subframe, the terminal 700 learns which resource pattern and which parameters in this resource pattern are used for sending as long as the terminal 700 learns on which subframe it is triggered.

If the resources corresponding to different resource patterns are placed on the same subframe, for example, two resource patterns are placed on the same subframe, the terminal learns on which subframe it is triggered, but still cannot determine which resource pattern on the subframe should be used. Therefore, in this case, the terminal 700 still needs to receive an indication which is sent by the base station and is about which resource patterns need to be used by the terminal 700, so that the terminal 700 selects a corresponding resource pattern from these subframes according to the indication, and selects a proper resource in the resource pattern for sending the SRS. That is to say, when a subframe includes the resources corresponding to at least two resource patterns, the terminal 700 may further include:

a receiving unit, configured to receive an indication which is sent by the base station 600 and is about a resource pattern, where the resource pattern exists on a subframe and is used to send an SRS.

In this case, the selecting unit 702 of the terminal 700 is further configured to select a resource pattern in at least one preset resource pattern according to the received indication, and select a resource in the selected resource pattern.

For the specific implementation of each unit above, reference may be made to the preceding embodiments, and details are not repeatedly described here.

It can be learned from the foregoing that, in this embodiment, at least one resource pattern is preset in the terminal 700, and the corresponding resource information is preset separately in the preset resource patterns according to different measurement requirements. After the terminal 700 is triggered by the base station 600, the selecting unit 702 of the terminal 700 may select a resource from the at least one preset resource pattern according to the trigger, and the sending unit 703 utilizes the selected resource to send an SRS. In this solution, multiple resource patterns are preset in the terminal, and therefore, different measurement requirements have their corresponding resource information, it is more flexible during resource matching, different measurement requirements may be met, and high PDCCH overhead or a waste of resources that occurs in the prior art is avoided. Moreover, the resource information further includes the duration. Therefore, as triggered once, the terminal may send the SRS for many times, which may reduce the number of the triggering PDCCHs, so as to further reduce the overhead of the triggering PDCCHs on the whole.

Embodiment 8

Figure 8:
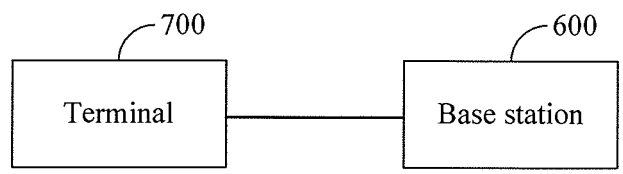
FIG. 8 is a schematic structural diagram of a communication system according to an embodiment of the present invention.

Correspondingly, the embodiment of the present invention further provides a communication system. As shown in FIG. 8, the communication system includes any terminal 700 provided in the embodiments of the present invention and any base station 600 provided in the embodiments of the present invention.

For the specific implementation of each unit above, reference may be made to the preceding embodiments, and details are not repeatedly described here.

It can be learned from the foregoing that, in the communication system provided in this embodiment, at least one resource pattern is preset in each of the base station 600 and the terminal 700, and corresponding resource information is preset separately in the preset resource patterns according to different measurement requirements. After obtaining requirement information of measurement, the base station 600 may select a proper resource pattern according to the requirement information, select, for the terminal 700 that needs to be triggered, a proper resource by searching the selected resource pattern, and utilize the selected resource to trigger the terminal 700. After triggered, the terminal may find a corresponding resource according to at least one preset resource pattern to send the SRS. In this solution, different requirement information has its respective corresponding resource information, and therefore, it is more flexible during resource information matching, and different measurement requirements may be met, and high PDCCH overhead or a waste of resources that occurs in the prior art is avoided. Moreover, the resource information further includes a duration. Therefore, as triggered once, the terminal may send the SRS for many times, which may reduce the number of the triggering PDCCHs, so as to further reduce the overhead of the triggering PDCCHs on the whole.

Persons of ordinary skill in the art may understand that all or part of the steps of the methods in the foregoing embodiments may be implemented by a program instructing relevant hardware. The program may be stored in a computer readable storage medium. The storage media may include: a read only memory (ROM, Read Only Memory), a random access memory (RAM, Random Access Memory), a magnetic disk, or a compact disk.

The foregoing describes the triggering method, the terminal, and the base station that are provided in the embodiments of the present invention in detail. Specific examples are used here to describe the principle and the implementation manners of the present invention, and the description of the foregoing embodiments is merely used to help the understanding of the methods and core ideas of the present invention; meanwhile, those of ordinary skill in the art can make modifications and variations to the specific implementation manners and application scope according to the ideas of the present invention. In summary, the contents of the specification shall not be constructed as limitations to the present invention.

What is claimed is:

1. A method for triggering a terminal to send a sounding reference signal, the method comprising:
   configuring at least two sets of resource information for the terminal through higher-layer signaling, wherein each set of resource information indicates a candidate resource for the sounding reference signal;
   selecting a resource for the terminal in at least two candidate resources respectively indicated by the at least two sets of resource information; and
   sending a triggering Physical Downlink Control Channel (PDCCH) to the terminal on a trigger subframe, so as to trigger the terminal to utilize the selected resource to send the sounding reference signal, wherein the trigger subframe is for indicating, to the terminal, a subframe to which the selected resource is applied.

2. The method according to claim 1, wherein each set of resource information comprises at least one of: time domain information of the resource, bandwidth information of the resource, frequency domain position information of the resource and frequency hopping information of the resource, cyclic shift information, and comb information.

3. The method according to claim 1, wherein the at least two sets of resource information include information in common.

4. The method according to claim 3, wherein the information in common is only a part of each of the at least two sets of resource information.

5. The method according to claim 4, wherein configuring the at least two sets of resource information for the terminal through the higher-layer signaling comprises:
   sending the information in common to the terminal through the higher-layer signaling; and
   sending other information except for the information in common in respective one of the at least two sets of resource information, to the terminal through the higher-layer signaling.

6. The method according to claim 1, wherein selecting the resource for the terminal in the at least two candidate resources respectively indicated by the at least two sets of resource information comprises:

selecting a set of resource information from the at least two sets of resource information; and
   selecting the selected resource for the terminal based on the selected set of resource information.

7. A method for sending a sounding reference signal in response to a trigger, the method comprising:
   receiving configuration from a base station through higher-layer signaling, wherein the configuration includes at least two sets of resource information, wherein each set of resource information indicates a candidate resource for the sounding reference signal;
   receiving the trigger of a triggering Physical Downlink Control Channel (PDCCH) on a trigger subframe from the base station, wherein the trigger subframe is used to indicate, to the terminal, a subframe to which a selected resource is applied;
   selecting the selected resource in at least two candidate resources respectively indicated by the at least two sets of resource information according to the trigger; and
   sending the sounding reference signal on the subframe to which the selected resource is applied according to the selected resource.

8. The method according to claim 7, wherein each set of resource information comprises at least one of: time domain information of the resource, bandwidth information of the resource, frequency domain position information of the resource and frequency hopping information of the resource, cyclic shift information, and comb information.

9. The method according to claim 7, wherein the at least two sets of resource information include information in common.

10. The method according to claim 9, wherein the information in common is only a part of each of the at least two sets of resource information.

11. The method according to claim 10, wherein receiving the configuration from the base station through the higher-layer signaling comprises:
    receiving the information in common through the higher-layer signaling; and
    receiving other information except for the information in common in respective one of the at least two sets of resource information through the higher-layer signaling.

12. A base station, comprising:
    a configuring unit, configured to configure at least two sets of resource information for a terminal through higher-layer signaling, wherein each set of resource information indicates a candidate resource for a sounding reference signal;
    a selecting unit, configured to a resource for the terminal in at least two candidate resources respectively indicated by the at least two sets of resource information; and
    a triggering unit, configured to send a triggering Physical Downlink Control Channel (PDCCH) to the terminal on a trigger subframe, so as to trigger the terminal to utilize the selected resource to send the sounding reference signal, wherein the trigger subframe is for indicating, to the terminal, a subframe to which the selected resource is applied.

13. The base station according to claim 12, wherein each set of resource information configured by the configuring unit comprises at least one of: time domain information of the resource, bandwidth information of the resource, frequency domain position information of the resource and frequency hopping information of the resource, cyclic shift information, and comb information.

14. The base station according to claim 12, wherein the at least two sets of resource information include information in common.

15. The base station according to claim 14, wherein the information in common is only a part of each of the at least two sets of resource information.

16. The base station according to claim 12, wherein the configuring unit is configured to send the information in common to the terminal through the higher-layer signaling, and send other information except for the information in common in respective one of the at least two sets of resource information, to the terminal through the higher-layer signaling.

17. The base station according to claim 12, wherein the selecting unit is configured to select a set of resource information from the at least two sets of resource information, and select the selected resource for the terminal based on the selected set of resource information.

18. A wireless terminal, comprising:
- a configured unit, configure to receive configuration from a base station through higher-layer signaling, wherein the configuration includes at least two sets of resource information, wherein each set of resource information indicates a candidate resource for the sounding reference signal;
- a triggered unit, configured to receive a trigger of a triggering Physical Downlink Control Channel (PDCCH) on a trigger subframe from the base station, wherein the trigger subframe is used to indicate, to the terminal, a subframe to which a selected resource is applied;
- a selecting unit, configured to select the selected resource in at least two candidate resources respectively indicated by the at least two sets of resource information according to the trigger; and
- a sending unit, configured to send a sounding reference signal on the subframe to which the selected resource is applied according to the resource selected by the selecting unit.

19. The wireless terminal according to claim 18, wherein each set of resource information comprises at least one of: time domain information of the resource, bandwidth information of the resource, frequency domain position information of the resource and frequency hopping information of the resource, cyclic shift information, and comb information.

20. The wireless terminal according to claim 18, wherein the at least two sets of resource information include information in common.

21. The wireless terminal according to claim 20, wherein the information in common is only a part of each of the at least two sets of resource information.

22. The wireless terminal according to claim 21, wherein the configured unit is configured to receive the information in common through the higher-layer signaling, and receive other information except for the information in common in respective one of the at least two sets of resource information through the higher-layer signaling.

* * * * *